United States Patent [19]

BEST AVAILABLE COPY

[11] 3,895,189

Matz

[45] July 15, 1975

[54] TELEPHONE COUPLER CONTROL MODULE FOR A DICTATING SYSTEM

[75] Inventor: Bjorn J. Matz, Forest Hills, N.Y.

[73] Assignee: Dictaphone Corporation, Rye, N.Y.

[22] Filed: June 29, 1973

[21] Appl. No.: 374,862

Related U.S. Application Data

[63] Continuation-in-part of Ser. No. 322,530, Jan. 10, 1973, Pat. No. 3,835,261, and Ser. No. 322,373, Jan. 10, 1973, Pat. No. 3,823,274, and Ser. No. 327,643, Jan. 29, 1973, Pat. No. 3,839,600.

[52] U.S. Cl. ........................ 179/6 R; 179/100.1 DR

[51] Int. Cl. ...................... G11b 19/00; H04m 11/10

[58] Field of Search ............ 179/6 R, 6 E, 100.1 DR

[56] References Cited

UNITED STATES PATENTS

| | | | |
|---|---|---|---|
| 3,467,781 | 9/1969 | Feat | 179/6 E |
| 3,524,026 | 8/1970 | Langendorf et al. | 179/6 E |
| 3,527,312 | 9/1970 | Dooley | 179/6 E |
| 3,527,891 | 9/1970 | Johnson | 179/6 E |
| 3,712,961 | 1/1973 | Nye et al. | 179/100.1 DR |

Primary Examiner—Stanley M. Urynowicz, Jr.
Assistant Examiner—Stewart Levy
Attorney, Agent, or Firm—Arthur V. Smith

[57] ABSTRACT

A control circuit for coupling a central record/-playback unit of an endless tape loop recording system with an automatic answering coupler of a telephone system, the control circuit including an audio pre-amplifier for receiving and amplifying audio signals from the answering coupler and means for supplying them to the recording section of the central record/-playback unit for recording on the endless loop of tape. The supplying means includes a D.C. current path to conduct signals from the central record/-playback unit to thereby activate the seizure circuit which causes an electromechanical tape transport mechanism to begin the recording operation and to simultaneously block the seizure of the system by any of a plurality of remote dictating stations. Manual and tape loop tautness sensitive switches are also provided to control the telephone message recording operation.

14 Claims, 4 Drawing Figures

TELEPHONE COUPLER CONTROL MODULE FOR A DICTATING SYSTEM

CROSS-REFERENCE TO RELATED APPLICATIONS

The present invention is intended for use particularly with the DICTATING AND TRANSCRIBING SYSTEM described in co-pending application Ser. No. 317,928 filed Dec. 26, 1972 of which the applicant is a joint inventor. This application is also a continuation-in-part of the following co-pending applications of which the applicant is the sole inventor:

PRIVACY AND SEIZURE CONTROL CIRCUIT FOR A REMOTE STATION DICTATING SYSTEM, Ser. No. 322,530 filed Jan. 10, 1973 now U.S. Pat. No. 3,835,261;

FARTHEST ADVANCE CIRCUIT FOR A REMOTE STATION DICTATING SYSTEM, Ser. No. 322,373 filed Jan. 10, 1973 now U.S. Pat. No. 3,823,274; and TRANSCRIBE CONTROL CIRCUIT FOR A DICTATING SYSTEM, Ser. No. 327,643 filed Jan. 29, 1973 now U.S. Pat. No. 3,839,600.

The disclosures in all of these applications are incorporated herein by reference.

BACKGROUND OF THE INVENTION

The invention relates to a dictating system of the type having a plurality of remote dictating stations which control a central record/playback, endless tape loop unit and more particularly to a control circuit for connecting an automatic telephone answering coupler to such a dictating system to allow a telephone caller to leave a recorded message.

It is especially desirable that the telephone caller be automatically connected into the dictating system, but since the system may already be in use through one of the remote dictating stations it is also necessary that the system have a privacy function to block the telephone caller from overriding the remote dictating stations and vice versa.

A standard telephone answering coupler is available from most telephone companies which will automatically answer a telephone and connect the telephone transmission lines to any desired system, but such couplers typically do not have the above-noted required privacy capability.

SUMMARY OF THE INVENTION

The above and other requirements are satisfied by the present invention of a control circuit module for interconnecting a telephone system with the central record/playback unit of an endless recording loop dictating system to allow the recording of telephone messages. The invention includes a pre-amplifier for receiving the message signals from a standard telephone system coupler and for supplying the amplified signals to the input of the central record/playback unit for recording and for simultaneously seizing control of the electro-mechanical tape drive circuits of the central record/playback unit. The control circuit module also includes a privacy signal activated switching circuit which controls the operation of the telephone coupler in response to signals from the central record/playback unit.

Additionally, the control circuit module of the invention includes an "end of tape" circuit which is responsive to a recording loop tautness sensing switch within the central record/playback unit. The recording loop tautness switch is activated when the loop of available recording material for dictation has been exhausted and the closing of this switch causes the control circuit to terminate the recording operation and activate the telephone coupler to "hang up" on the telephone caller.

The control circuit module of the invention is adapted for both automatic and semi-automatic call answering and message recording operations.

It is therefore an object of the present invention to provide a simplified control circuit module for interconnecting a telephone transmission line coupler to the central record/playback unit of a remote station dictating system.

It is still another object of the present invention to provide a solid state circuit for automatically providing a privacy function in the connection of a telephone answering coupler to a central record/playback unit of a dictating system.

It is still a further object of the present invention to provide a control circuit for connecting a telephone system coupler to a central record/playback unit of a dictating system for recording a telephone message in the central record/playback unit, which control circuit automatically monitors the tautness of the recording loop within the central record/playback unit.

The foregoing and other objectives, features, and advantages of the invention will be more readily understood upon consideration of the following detailed description of certain preferred embodiments of the invention, taken in conjunction with the accompanying drawings.

DESCRIPTION OF THE PREFERRED EMBODIMENT

Figure 1:
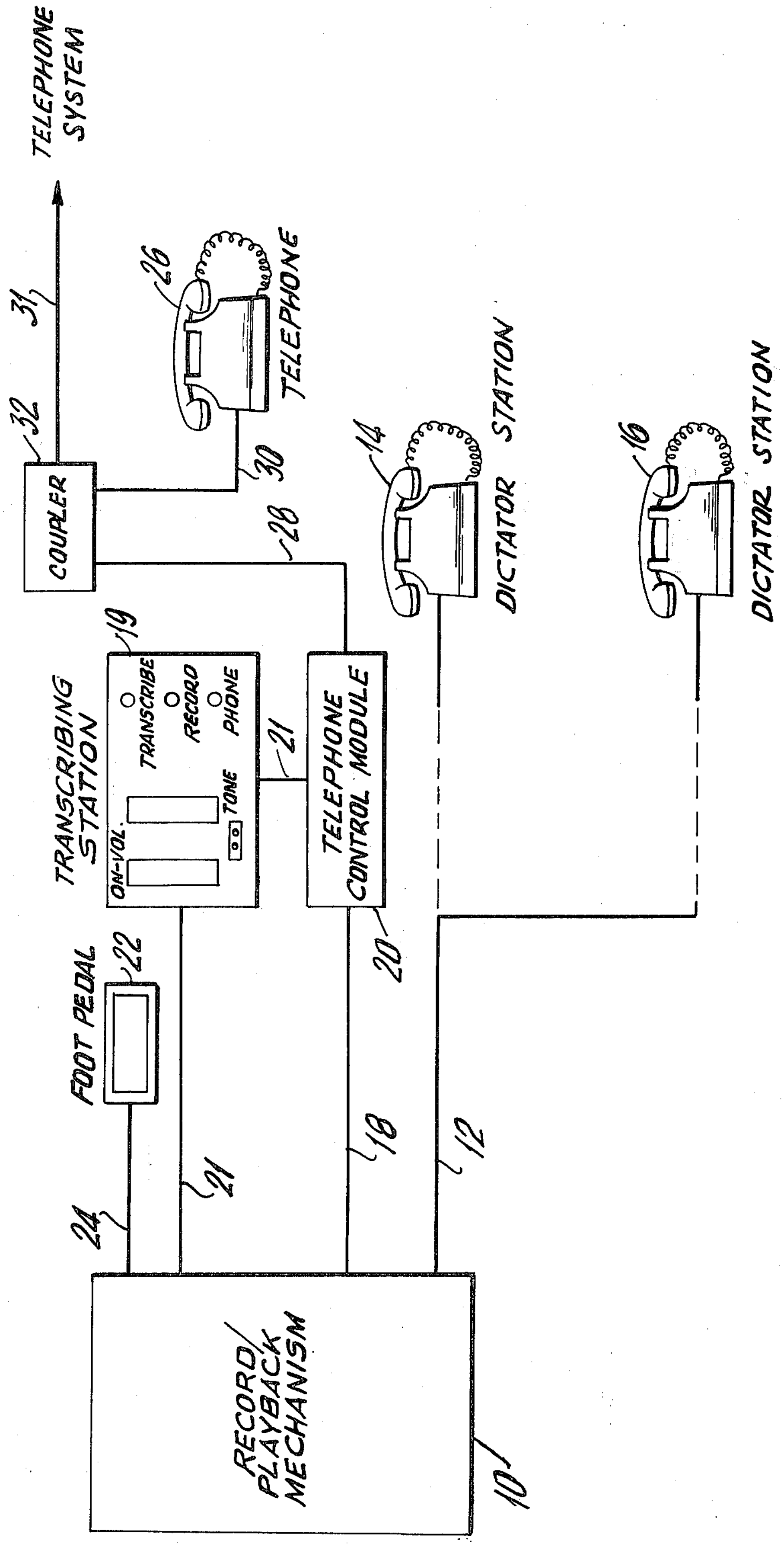
FIG. 1 is a diagrammatic illustration of a remote station dictating system in which the invention is intended to be used and including the telephone message control module of the invention.

Referring now more particularly to FIG. 1 a dictating/playback system is diagrammatically illustrated as comprising a central record/playback unit 10 of the endless loop type which is connected through a multi-conductor cable 12 to a plurality of remote dictating stations illustrated generally by dictating stations 14 and 16 which are connected in parallel with the record/playback unit 10. The record/playback unit 10 is also connected through a multi-conductor cable 21 to a transcribing station 19. At the transcribing station messages recorded from the dictating stations 14 or 16 on an endless loop of magnetic tape (not shown) within the record/playback unit 10 may be played back to a typist. The transcribe mode of the record/playback unit 10 is controlled by a typist with a foot pedal 22 connected to the record/playback unit through a cable 24.

The dictate/playback/rewind modes at each dictating station are controlled at the particular dictating station 14 or 16.

When any dictating station is being used ("activated") to record or playback messages on the tape loop within the record/playback unit 10, the remaining remote dictating stations connected in parallel with it are blocked from controlling the record/playback unit and are unable to hear what is being recorded or played back through the activated remote dictating station by means of the privacy and seizure control circuit described in the co-pending applications noted above and also in more detail hereinafter.

A telephone control module 20 is also connected to the central record/playback unit 10 by a multiconductor cable 18 and to the transcribing station 19 by a multiconductor cable 21. A telephone answering coupler 32 is connected to the telephone control module 20 by a multiconductor cable 28. The telephone answering coupler is further connected to an external telephone 26 by a multi-conductor cable 30 and to the transmission lines of a telephone system by a multiconductor cable 31. As stated above the purpose of the module 20 is to additionally allow telephoned messages to be recorded on the endless loop of tape within the central record/playback unit 10 for later transcription through the transcribing station 19.

Figure 2:
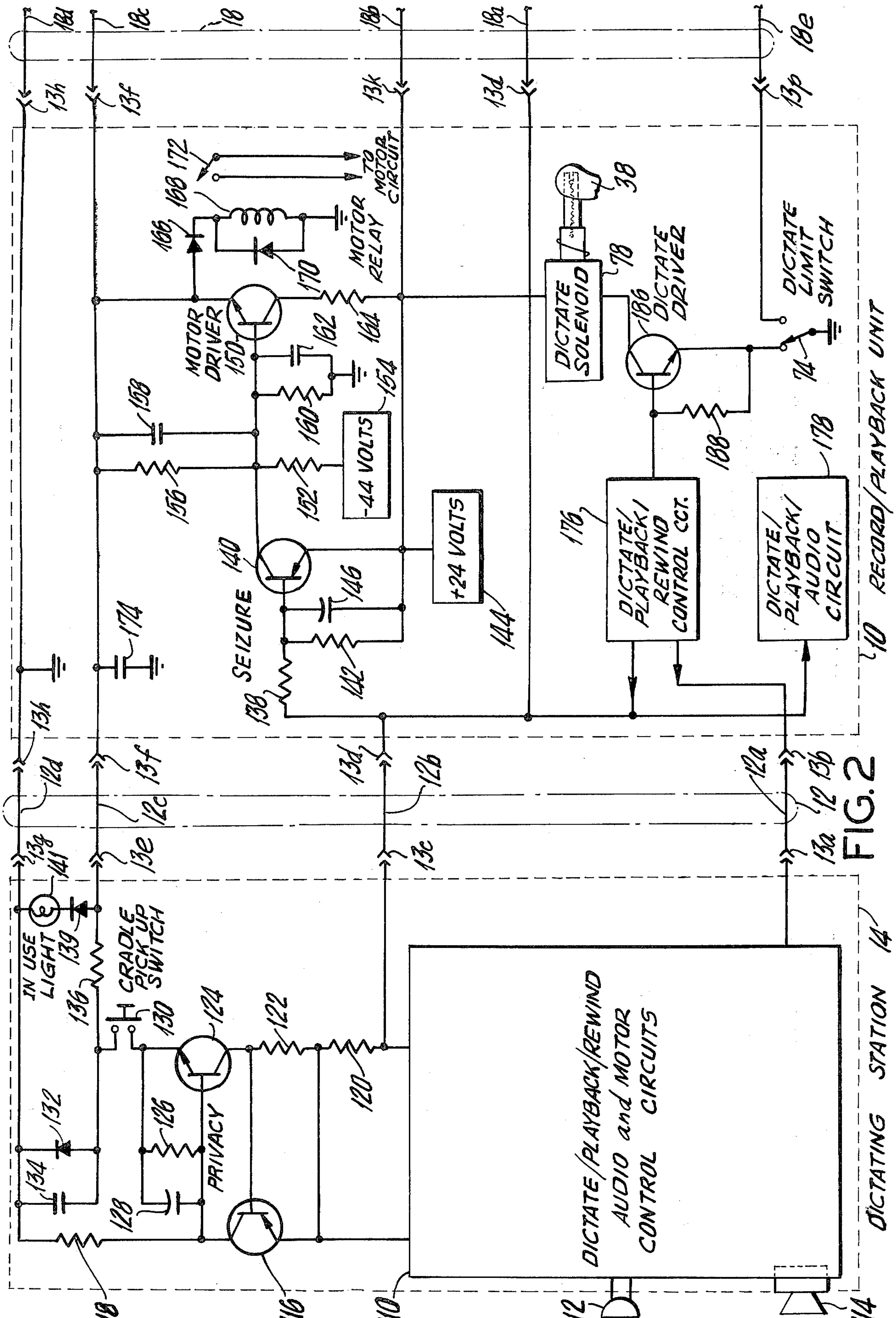
FIG. 2 is a schematic diagram of the seizure control circuit of the remote dictating station and of the central record/playback unit of the system depicted in FIG. 1.

Referring now more particularly to FIG. 2 the remote dictating station 14, illustrated as being enclosed by a dotted line, includes dictate, playback, rewind, audio and motor control circuits designated generally 110, a microphone 112 and a playback speaker 114 connected to the circuits 110. The circuits 110 supply the audio signal which is recorded at the central record/playback mechanism 10 and also provide control signals to control the record/playback unit motor and the electromagnetic tape loop handling mechanisms (not shown) within the central record/playback unit 10. These electromagnetic mechanisms are discussed in greater detail in the co-pending applications referred to above. Also the details of the circuits 110 are not shown since they are not relevant to the invention and may comprise any of various circuits of this type known to the art or they may comprise circuits of the type disclosed in the aforementioned co-pending applications of which the applicant is an inventor.

A lead 12*a* in the multi-conductor cable 12 is connected between an external terminal 13*a* at the remote dictating station 14 and an external terminal 13*b* at the central record/playback unit 10. A lead 12*b* in the multiconductor cable 12 is connected between an external terminal 13*c* of the remote dictating station and an external terminal 13*d* at the central record/playback unit. The circuits 110 are connected directly to the terminals 13*a* and 13*c*.

The circuits 110 are also connected to the emitter electrode of a PNP transistor 116 whose collector electrode is connected through a resistor 118 to the external terminal 13*g* at the dictating station 14. The external terminal 13*g* is connected through a wire 12*d* within the multiple conductor cable 12 to an external terminal 13*h* at the record/playback mechanism 10. The terminal 13*h* is connected to the circuit ground within the record/playback unit 10.

The emitter electrode of the transistor 116 is connected to the terminal 13*c* through a resistor 120 and to its own base electrode through a resistor 122. The base electrode of the transistor 116 is connected to the collector electrode of an NPN transistor 124. The base electrode of the transistor 124 is connected directly to the collector electrode of the transistor 116 and through a resistor 126 to the emitter electrode of the transistor 124. A capacitor 128 is connected in parallel with the resistor 126. The emitter electrode of the transistor 124 is connected to one lead of a normally open, cradle pickup switch 130 whose other lead is connected to the anode of a diode 132. The cathode of the diode 132 is connected to the grounded external terminal 13*g*. The normally open cradle pickup switch 130 is closed when the handset of the dictating station is lifted from its cradle.

A capacitor 134 is connected in parallel with the diode 132. The anode of the diode 132 is connected through a resistor 136 to the anode terminal of a diode 139 whose cathode terminal is connected through an "in use" light 141 to the terminal 13*g*. The anode terminal of the diode 139 is also connected to an external terminal 13*e* at the dictating station 14. The terminal 13*e* is connected by a wire 12*c* in the multiple conductor cable 12 to an external terminal 13*f* at the record/playback unit 10.

The external terminal 13*d* of the record/playback unit 10 is +24 through a resistor 138 to the base electrode of a PNP "seizure" transistor 140 and through a resistor 142 to a bias source 144 of volts. A capacitor 146 is connected in parallel with the resistor 142. The emitter electrode of the transistor 140 is connected to the bias source 144.

The collector electrode of the transistor 140 is connected to the base electrode of an NPN, motor driver transistor 150 and through a resistor 152 to a bias source 154 of −44 volts. The collector electrode of the transistor 140 is further connected to the external terminal 13f through a resistor 156 connected in parallel with a capacitor 158. The external terminal 13f is connected to the circuit ground through a capacitor 174.

The base electrode of the transistor 150 is connected to the circuit ground through a resistor 160 connected in parallel with a capacitor 162. The collector electrode of the transistor 150 is connected through a resistor 164 to the bias source 144 which is also connected to an external terminal 13*k* at the central record/playback unit 10. The emitter electrode of the transistor 150 is connected directly to the terminal 13*f* and to the anode of a diode 166 whose cathode is connected to one lead of the coil of a motor control relay 168. The other lead of the relay coil 168 is connected to the circuit ground. The anode of a diode 170 is connected to the circuit ground and the cathode of the diode 170 is connected to the cathode of the diode 166. The purpose of the diode 170 is to provide a shunt circuit for back EMF generated in the relay coil 168 when voltage is rapidly supplied and discontinued through the diode 166. The motor relay 168 opens and closes a pair of relay contacts 172 to energize the tape loop transport motors (not shown) of the record/playback unit 10.

The external terminal 13d is connected to a separate input of a dictate/playback/rewind control circuit 176 and to a dictate/playback audio circuit 178 which are within the record/playback unit 10. The circuits 176 and 178 are not shown in detail since they are not directly pertinent to the present invention and they may comprise circuits of the type known to those skilled in the art. As is explained in greater detail hereinafter and in the aforementioned co-pending applications, the control circuits 110 in the dictating unit 14 activate the circuits 176 and 178 by providing a circuit ground return path to the "input" leads of the circuits 176 and 178. It is to be understood that a plurality of dictating stations are connected in parallel through the multiple conductor cable 12 to the terminals 13*b*, 13*d*, 13*f* and 13*h* of the record/playback unit 10.

In operation, when the hand unit of a particular dictating station, such as dictating station 14, is lifted from its cradle the cradle pickup switch 130 is closed thereby supplying a −44 volt bias from the source 154 through the resistors 152, 156 and 136 and the switch 130 to the emitter electrode of the transistor 124. The −44 volt bias supplied to the emitter-electrode of the transistor 124 also flows through the resistors 126 and 118 to the circuit ground thereby developing a positive bias voltage on the base of transistor 124 which makes it become conductive or "on."

When transistor 124 becomes conductive, current from the +24 volt source 144 flows through the resistors 142, 138, and 120, the emitter-base junction of the transistor 116 in parallel with the resistor 122, the collector-emitter junction of the transistor 124, the switch 130 and the diode 132 to the circuit ground. The voltage drop developed across the resistor 122 places a negative bias on the base of the transistor 116 with respect to its emitter thereby making it conductive. When transistor 116 becomes conductive it supplies a positive bias to the base of transistor 124 from the junction of the resistors 120 and 122 and thus the transistors 116 and 124 "lock up" on each other in the conductive condition.

The flow of bias current from the +24 volt source 144 through the resistor 142 as described above also develops a negative bias voltage on the base electrode of the transistor 140 thereby turning it on. When transistor 140 thus becomes conductive, current from the −24 volt source 144 flows through the emitter-collector junction of the transistor 140 and the resistor 160 to the circuit ground thereby providing a positive bias voltage to the base of the motor driver transistor 150. This causes the transistor 150 to become conductive and thereby supply a voltage from the +24 volt source through the collector load resistor 164 and the collector-emitter junction of the transistor 150 to the motor relay 168 through the semiconductor diode 166. The current flowing through the motor relay 168 energizes it and closes the contact switch 172 to thereby turn the record/playback unit motors on.

The positive voltage supplied to the motor relay 168 at the emitter electrode of the motor driver transistor 150 is also supplied to the external terminal 13*e* of the dictating station. The resistances 156 and 152 in series with the −44 volt source 154 are sufficiently high in magnitude that the potential developed at the external terminal 13*e* after the motor driver transistor 150 becomes conductive is substantially +24 volts. The +24 volt potential at terminal 13*e* flows through the diode 139 and the in use lights 141 of each of the dictating stations which are connected in parallel with the dictating station 14. The in use lights 141 are thus lighted to indicate that control of the central record/playback unit 10 has been seized.

This positive bias voltage at terminal 13*e* also prevents any other dictating stations from seizing control of the system. When a particular cradle pickup switch 130 in any other dictating station is closed subsequent to the seizure of control by one dictating station there is no −44 volt bias voltage to be applied to the emitter electrode of the transistor 124 connected to the closed pickup switch 130. This prevents the transistor pairs 116 and 124 from locking up on each other and thereby prevents the other dictating stations from seizing control of the system.

All of the audio and control circuits 110 of the remote dictating station 14 require a ground return connection to the circuit ground terminal 13*h* of the record/playback unit 10 in order to operate. When a remote dictating station 14 has seized control of the central record/playback unit 10 this ground return is supplied by the series connection through the resistor 120, the emitterbase junction of the transistor 116 in parallel with the resistor 122, the collector-emitter junction of the transistor 124, the cradle pickup switch 130, the diode 132, and the lead 12*d* to the circuit ground terminal 13*h*. Thus the other dictating stations connected in parallel with the activated dictating station 14 are disabled from controlling the central record/playback unit 10 so long as one dictating station 14 has seized control of the system because in the other dictating stations the transistors 124 are in their non-conductive or open state, and as explained above, may not be made conductive because of the +24 volt bias voltage applied to the lead 12*c*. In such other dictating stations the circuit ground return path is reverse biased to be electrically "open."

The base electrode of an NPN, dictate driver transistor switch 186 is connected to the output of the dictate/playback/rewind circuit 176. The collector electrode of the transistor 186 is connected to one lead of a dictate solenoid 78 which operates a pressure roller-capstan arrangement 38 (not shown in detail) to advance the loop of magnetic tape within the central record/playback unit. The other lead of the dictate solenoid 78 is connected to the +24 volt source 144. The emitter electrode of the transistor 186 is connected to the circuit ground through a normally closed, single pole-double throw dictate limit switch 74. The base electrode of the transistor 186 is also connected to the emitter electrode of the transistor 186 through a resistor 188. The normally open terminal of the dictate limit switch is connected to an external terminal 13p at the central record/playback unit 10. When the dictate/-playback/rewind control circuits 176 are supplied with a "D.C. ground path" at terminal 13d they bias the transistor 186 to become conductive and energize the dictate solenoid 78. The energization of the solenoid 78 causes the capstan-pressure roller mechanism to advance the tape.

Figure 3A:
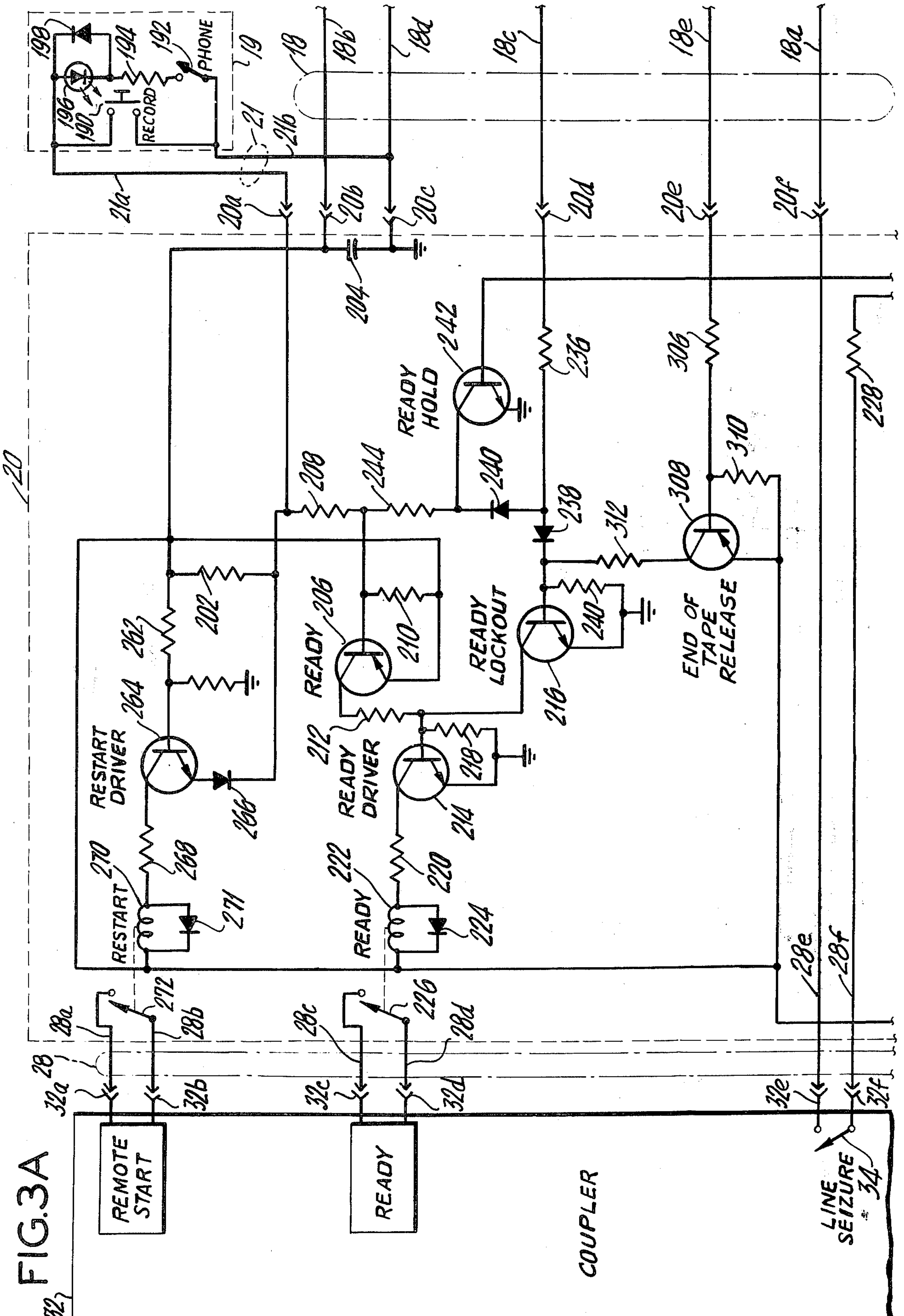
FIGS. 3A and 3B are a schematic diagram of the telephone message control module of the invention.
Figure 3B:
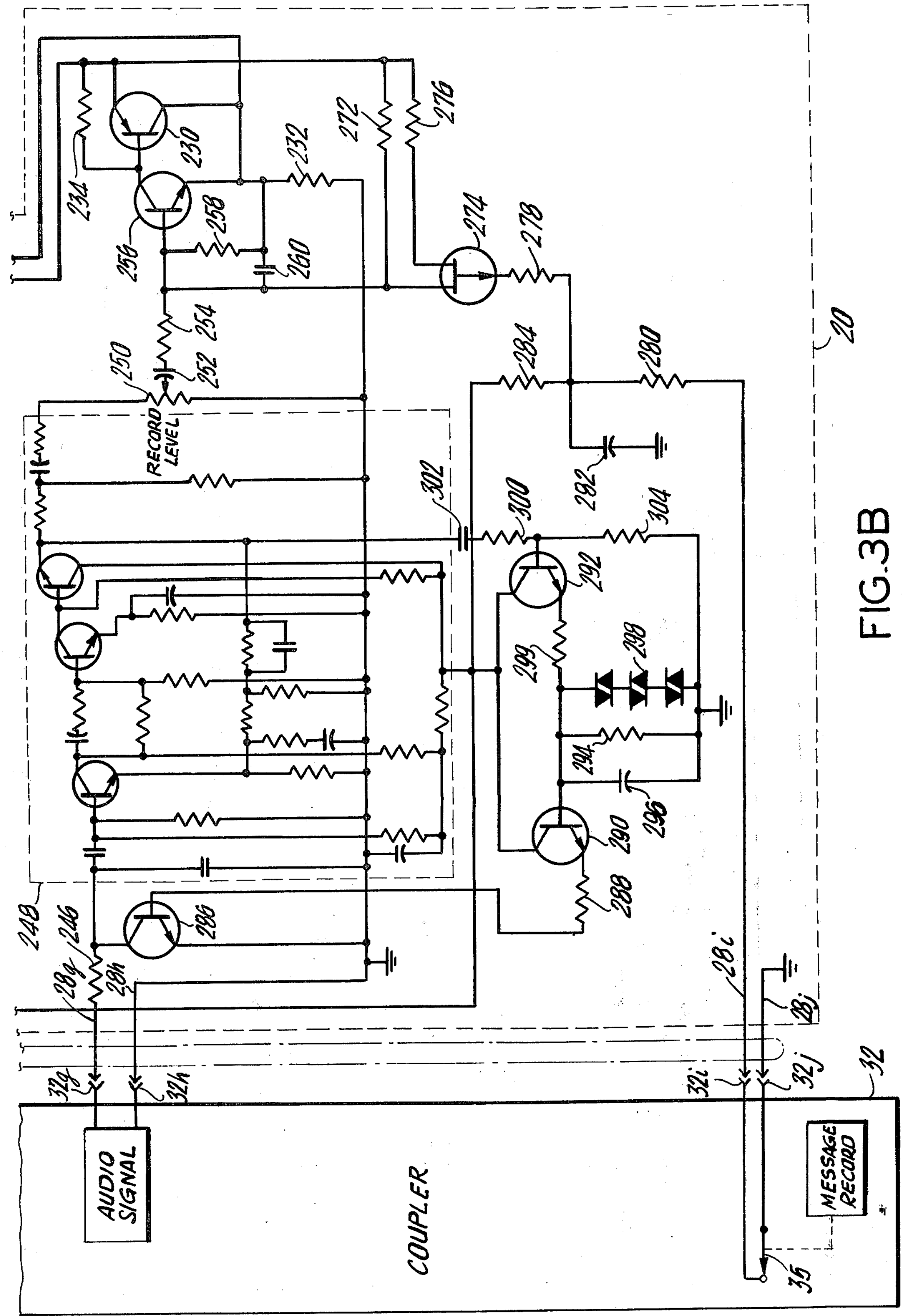

Referring now more particularly to FIG. 3 the details of the control module 20 and a portion of the transcribing station 19 are illustrated. Within the transcribing station 19 a normally open switch 190, labeled "record," is connected between external terminals 20*c* and 20*a* of the control module 20 through leads 21*b* and 21*a*, respectively. The terminal 20c is connected directly to the circuit ground of the control module 20 and is also connected to the circuit ground of the record/playback unit 10 through a lead 18*d* connected to the terminal 13h. A push-on/push-off "phone" switch 192 is connected in series with a resistor 194 between the lead 21*b* and the anode of a diode 198. The cathode of the diode 198 is connected to the lead 21*a*. A light emitting diode 196 is connected in parallel with the diode 198 but with a reversed polarity. The purposes of these switches 190 and 192 and the diodes 196 and 198 will be explained in further detail hereinafter.

The control module 20 will now be described operationally. As has been previously stated the answering coupler 32 is a standard item available from most telephone companies and therefore it is not shown and described in detail. The operation of the coupler 32 is such that it will "answer" a telephone call in response to a ringing signal (over the telephone lines) provided a first pair of "ready" input terminals 32*c* and 32*d* on the coupler 32 are interconnected. It will also "answer" a telephone call without a ringing signal when both the ready terminals 32*c* and 32*d* are interconnected and a second pair of "remote start" input terminals 32*a* and 32*b* of the coupler 32 are interconnected. When the coupler 32 "answers" a call it simultaneously places an impedance across the telephone lines to cause the telephone company relays to "latch" onto the line and also supplies audio signals from the telephone lines to a pair of output terminals 32*g* and 32*h* of the coupler 32.

Assuming that the phone switch 192 in the transcribing station 19 is closed, a current is drawn through the light emitting diode 196 and the resistor 194 to the circuit ground through the leads 21*a* and 21*b* causing the light emitting diode 196 to light up (and thereby indicating that the system will automatically answer and record telephone calls unless logically prevented). The current from the lead 21*a* is supplied through the terminal 20*a* and a resistor 202 connected to a terminal 20*b* of the control module 20. The terminal 20*b* is connected to the circuit ground of the control module 20 through a capacitor 204 and is also connected through a lead 18*b* to the external terminal 13*k* of the central record/playback unit 10. The terminal 13*k* is connected to the +24 volt source 144.

The base electrode of a PNP transistor 206 is connected through a resistor 208 to the terminal 20a and through a resistor 210 to the (+24 volt supply) terminal 20*b*. The emitter electrode of the transistor 206 is connected directly to the terminal 20*b*. The current flowing through the resistor 202 due to the closed phone switch 192 is just sufficient to bias the base electrode of the transistor 206 to cause it to become conductive. The collector electrode of the transistor 206 is connected through a resistor 212 to the base electrode of a NPN transistor 214 and to the collector electrode of an NPN transistor 216.

The base electrode of the transistor 214 is also connected through a resistor 218 to its emitter electrode and to the circuit ground. The collector electrode of the transistor 214 is connected through a resistor 220 and the coil of a relay 222 to the (+24 volt supply) terminal 20b. A diode 224 is connected in parallel with the coil 222 to provide a back EMF shunt.

When the transistor 206 becomes conductive it provides a bias to the base electrode of the transistor 214 which causes it to become conductive and thereby energize the coil of the relay 222. When the relay coil 222 is energized it closes the contacts of a switch 226. The contacts of the switch 226 are connected by leads 28*c* and 28*d* of the multiconductor cable 28 to the ready input terminals 32*c* and 32*d* of the coupler 32.

The closing of the relay contacts 226 is sensed by the ready function of the coupler 32 so that if a phone call comes in the coupler will "answer" the phone as described above and close a line seizure switch 34. The line seizure switch 34 is connected to a pair of external terminals 32*e* and 32*f* of the coupler 32. These terminals are in turn connected to a pair of leads 28*e* and 28*f* of the multi-conductor cable 28, respectively. The lead 28*e* is connected to an external terminal 20*f* of the control module 20. The terminal 20*f* is connected by a lead 18*a* to the terminal 13*d* of the central record/playback unit 10. It will be remembered that the terminal 13*d* is the seizure control and audio input terminal of the record/playback unit 10.

The lead 28*f* is connected through a resistor 228 to the emitter electrode of a PNP transistor 230 whose collector electrode is connected through a resistor 232 to the circuit ground. The emitter electrode of the transistor 230 is connected to its base electrode through a resistor 234. A direct current signal (approximately 40 ma.) flows from the terminal 13*d* of the central record/playback unit 10 through the lead 18*a*, through the closed line seizure switch 34, the lead 28*f*, the resistor 228, the emitter-collector junction of the transistor 230, the emitter-base junction of transistor 242 in parallel with the resistor 232 to the circuit ground to thereby cause the record/playback unit 10 to be seized. The DC ground return path provided through the transistor 230 and to some extent through the collector-emitter junction of transistor 256 not only makes the seizure transistor 140 become conductive and thereby causes the central record/playback unit to be seized, but it also energizes the dictate/playback/rewind control circuit 176, the dictate driver switch 186 and the dictate solenoid mechanism 78, thereby engaging the tape loop to begin the recording of the telephone caller' s message onto the tape loop within the central record/playback unit.

As was described above, when the central record/playback unit is seized, a +24 volt bias is supplied to all of the terminals 13*e* in the remote dictating stations to prevent them from seizing control of the central record/playback unit. The in-use lights 141 of each of the remote dictating stations are lit by this +24 volt reverse bias to indicate that the central record/playback unit has been seized.

Furthermore, when the central record/playback unit seizes, a +24 volt bias is also placed on the privacy line at external terminal 13*f* of the central record/playback unit. The terminal 13*f* is connected by a lead 18*c* to an external terminal 20d of the control module 20. The terminal 20*d* is connected through a resistor 236 to the anode of a diode 238 and the anode of a diode 240. The cathode of the diode 240 is connected to the collector electrode of an NPN transistor 242. The emitter electrode of the transistor 242 is connected to the circuit ground. The base electrode of the transistor 242 is connected to the collector electrode of the transistor 230. The collector electrode of the transistor 242 is also connected through a resistor 244 to the base electrode of the transistor 206. The cathode of the diode 238 is connected to the base electrode of the transistor 216. The base electrode of the transistor 216 is connected to the circuit ground through a resistor 240. The emitter electrode of the NPN transistor 216 is also connected to the circuit ground.

When the privacy line connected to the terminal 20*d* is raised to +24 volts the base electrode of the transistor 216 would normally be biased to make the transistor 216 conductive thereby causing the ready driver transistor 214 to become non-conductive and thereby shutting down the system. However, because the base electrode of the transistor 242 is connected to the collector electrode of the transistor 230 the D.C. current flowing from the terminal 20*f* through the transistor 230 due to the seizure function of the record/playback unit 10 causes the transistor 242 to become conductive thereby effectively shunting the junction of the anodes of the diodes 240 and 238 to ground potential. This prevents the base of the transistor 216 from being conductively biased.

With the record/playback unit thus seized by an incoming telephone call the coupler produces audio signals at its external terminals 32*g* and 32*h*. The terminal 32h is connected by a lead 28*h* to the circuit ground of the control module 20. The terminal 32*g* is connected through a lead 28*g* in series with a resistor 246 to the input of a transistor amplifier generally designated 248. The components of the amplifier 248 will not be described in detail since such cascade connected transistor amplifiers are well known. The output of the amplifier 248 appears across a potentiometer 250 the sliding contact of which is connected through a capacitor 252 in series with a resistor 254 to the base electrode of an NPN transistor 256. The collector electrode of the transistor 256 is connected directly to the base electrode of the transistor 230 and its emitter electrode is connected directly to the collector electrode of the transistor 230. The base electrode of the transistor 256 is connected through a resistor 258, in parallel with a capacitor 260, to its emitter electrode.

Together the amplifier 248 and the transistors 256 and 230 amplify the audio signal, which is in fact the telephone message to be recorded, and pass it through the leads 28*f*, 28*e* and 18*a* to be recorded in the record/playback unit 10. In this mode the record/playback unit 10 operates as though one of the dictating units 14 was dictating and recording a message as described above.

When the telephone caller hangs up, the line seizure contacts 34 are automatically opened by the coupler 32 thereby breaking the D.C. ground path through the leads 28*e* and 28*f* and thereby freeing the record/playback unit 10. The ready contacts 226 of the ready relay 222 remain closed as long as switch 192 is closed and the record/playback unit 10 is not seized. However, assuming that one of the remote dictating stations thereafter seizes the record/playback unit 10 the +24 volts which appear on the privacy line connected to the terminal 20d will bias the transistor 216 into a conductive state thereby shunting the potential of the base electrode of the transistor 214 to the circuit ground. The ready hold transistor 242 will no longer provide a shunt path for the privacy signal since its base electrode is not supplied with a portion of the D.C. seizure current from the collector of the transistor 230. With the transistor 214 non-conductive and the relay coil 222 de-energized, the relay contacts 226 are open. The coupler senses this fact and will thereafter not automatically answer any incoming telephone calls as long as the record/playback unit 10 remains seized by one of the dictating stations 14.

The system also has the capability of providing a semi-automatic recording function. In this mode the switch 192 is left open. An incoming call is not answered by the coupler 32 because the relay contacts 226 are open. An attendant must manually answer the call on the telephone 26. Assuming that the caller requests to leave a recorded message on the record/playback unit 10 the attendant then presses the record button switch 190. The closing of the switch 190 causes the terminal 20*a* to be grounded thereby biasing the transistor 206 on and thereby also causing the transistor 214 to become conductive and energize the relay 222. The energization of the relay coil 222 closes the relay contacts 226.

The coupler, however, normally only responds to the ringing signal supplied through the telephone transmission lines and therefore requires that the terminals 32*a* and 32*b* also be interconnected. In this mode of operation the momentary closing of the phone switch 190 causes a greater current to flow through the resistor 202 than would flow through it due only to the closing of the switch 192 in series with the resistor 194 and the LED 196. This increased current flows through the resistor 202 and the switch 190 to the circuit ground and causes a conductive bias to be applied through a resistor 262 to the base electrode of an NPN transistor 264 whose emitter electrode is connected to the anode of a diode 266. The current flowing through the resistor 202 when only the switch 192 is closed is not sufficient to generate a conductive bias at the base of the transistor 264.

The cathode electrode of the diode 266 is connected to the terminal 20*a*. The collector electrode of the transistor 264 is connected in series with a resistor 268 and the coil of a restart relay 270 to the (+24 volt supply terminal) 20*b*. A back EMF shunt diode 271 is connected in parallel with the relay coil 270. When the transistor 264 is made conductive the relay 270 is energized to close a pair of relay contacts 272 which are connected by leads 28*a* and 28*b* to the input terminals 32*a* and 32*b*, respectively, of the coupler 32.

The coupler senses when both the contacts 272 and 226 are closed and closes the line seizure switch 34 to record a message in the same manner as described above. The design of the coupler 32 is such that once the message is being recorded in the record/playback unit 10 the attendant can only hear whether the message is being recorded and can no longer speak to the caller over the telephone 26. This feature is to satisfy F.C.C. "beep signal" requirements regarding the recording of two way conversations.

It should be noted that it is not necessary that the switch 192 be closed once the restart button is pushed. When the coupler 32 closes the switch 34 and thereby seizes the record/playback unit 10 the ready hold transistor 242 is caused to become conductive, as explained above, so that the base of the transistor 206 is provided with a ground biasing path through the resistor 244 to thereby become conductive and keep the relay 222 energized and the relay contacts 226 closed. When the telephone message is completed and the caller hangs up, the opening of the line seizure switch 34 causes the ready hold transistor 242, the ready transistor 206 and the ready driver transistor 214, in turn, to become non-conductive. The relay 222 is thereby de-energized and the relay contacts 226 are opened to restore the system to its initial state.

It should be emphasized that if the record/playback unit 10 is seized by one of the remote dictating stations 14 the control module 20 will prevent the coupler 32 from even answering the phone. This is true because the privacy signal supplied through the terminal 20d causes the ready lock out transistor 216 to become conductive thereby shunting any conductive bias at the base of the transistor 214 to the circuit ground. Even if an attendant pushes the phone switch 190 the ready lock out transistor 216 prevents the ready driver transistor 214 from being made conductive. Since the ready driver transistor 214 is non-conductive the de-energized relay contacts 226 are open and the coupler senses this fact and does not answer the phone.

The way that the caller knows that he is connected to the record/playback unit 10 is that once the coupler 32 seizes the line by closing the switch 34 it gives out an audible beep signal which also appears at the terminals 32*g* and 32*h* to be amplified by the transistor amplifiers 248, 256 and 230. This beep signal lasts for approximately half a second. The attendant knows the caller has been connected since she too will hear the beep signal and be prevented from talking to the caller as previously described. Since the amplified beep signal is loud in volume and has proven to be an annoyance to secretaries transcribing the recorded message, means are provided for muting the signal. To this end a resistor 272 is connected between the base electrode of the transistor 256 and the emitter electrode of the transistor 230. The source and drain electrodes of a FET 274 are connected through a resistor 276 in parallel with the resistor 272. The resistance of the resistor 276 is approximately one tenth the resistance of the resister 272. The gate electrode of the FET 274 is connected through a high impedance 278 in series with a relatively low impedance 280 to a lead 28*i*. The lead 28*i* is connected to an external terminal 32i of the coupler 32.

Within the coupler a "message record" switch 35 which is normally closed is connected between the terminal 32*i* and an external terminal 32*j* of the coupler. The external terminal 32*j* is connected by a lead 28*j* to the circuit ground of the control module 20. The junction of the resistors 278 and 280 is connected through a capacitor 282 to the circuit ground and through a resistor 284 to the (+24 volt) terminal 20*b*.

In practice, when the beep signal is originated the contact switch 35 within the coupler is momentarily opened. The capacitor 282 which has essentially been uncharged until this point begins to charge through the resistor 284 from the +24 volt source connected to the terminal 20*b*. During this charging process the transistor 274 is biased to become conductive thereby connecting the resistor 276 in shunt with the resistor 272. The gain of the transistor amplifier comprised of the transistors 256 and 230 is roughly proportional to the ratio of the feedback resistor (resistor 272 or resistor 276) to the resistor 254. Thus when the transistor 274 places the resistor 276 in shunt with the resistor 272 the gain of the amplifier combination is essentially reduced to one tenth of its former value. The beep tone is thereby made barely audible to the transcriptionist. The barely audible beep will still be heard by the transcriptionist, however, to indicate that the recorded message was delivered through the telephone.

It is desirable that the transistor amplifier 248 be provided with an automatic volume control. To this end the collector of an NPN transistor 286 is connected to the junction of the resistor 246 and the input of the transistor amplifier 248. The emitter electrode of the transistor 286 is connected to the circuit ground and its base electrode is connected through a resistor 288 to the emitter electrode of an NPN transistor 290. The collector electrode of the transistor 290 is connected to the collector electrode of an NPN transistor 292 and to the +24 volt source at the terminal 20*b*. The base electrode of the transistor 290 is connected to the circuit ground through a resistor 294 in parallel with a capacitor 296 and is also connected through a resistor 299 to the emitter electrode of the transistor 292. Three varistors denoted by the reference numeral 298 are connected in series between the base electrode of the transistor 290 and the circuit ground. The base electrode of the transistor 292 is connected through a resistor 300 in series with a capacitor 302 to an intermediate output of the amplifier 248. The base of the transistor 292 is also connected to the circuit ground through a resistor 304.

In operation, the transistor 286 and the resistor 246 act as a voltage divider of the incoming audio signal to automatically control the volume of the transistor amplifier 248. The positive peaks of the intermediate output signal through the capacitor 302 and the resistor 300 cause the transistor 292 to become more conductive. When the transistor 292 becomes momentarily conductive a positive bias is applied through the resistor 299 to charge the capacitor 296. When the capacitor 296 becomes sufficiently charged the base electrode of the transistor 290 is conductively biased so that a positive signal is applied from the emitter electrode of the transistor 290 to make the transistor 286 more conductive. In order to prevent clipping the varistors 298 have a logarithmic voltage versus current characteristic, i.e. the voltage varies as the logarithm of the current through the varistors. Thus when a large amplitude signal is received at the base electrode of the transistor 292 the gain control voltage applied to the base of the transistor 290 is increased logarithmicly so that the incoming audio signal is not clipped by momentary high amplitude signals. The attack time of the volume control circuit is determined by the RC constant of the resistor 299 and the capacitor 296. This is considerably faster than the decay time which is determined by the RC constant of the capacitor 296 and the resistor 294 in parallel with the series connected base-emitter junctions of the transistors 290 and 286.

It can sometimes happen that the amount of available tape for recording is exhausted either during or before the recording of the message. When the loop of tape within the central record/playback unit 10 which is available for dictation is exhausted it becomes taut and thereby throws the contact arm of the dictate limit switch 74 to connect the external terminal 13*p* of the central record/playback unit 10 with the circuit ground. The emitter electrode of the dictate driver transistor 186 is simultaneously disconnected from the circuit ground. This causes the dictate driver switch 186 to become non-conductive and thereby de-energize the dictate solenoid 78 so that the tape loop is no longer driven by the central record/playback unit (as is described in greater detail in the above-mentioned co-pending application for a Farthest Advance Circuit).

In order to provide an indication of this end of tape situation to the telephone caller an end tape telephone coupler release function is provided. As described above the closure of the dictate limit switch 74 places the terminal 13*p* of the record/playback unit 10 at ground potential. The terminal 13*p* is connected by a lead 18*e* to the terminal 20*e* of the control module 20. The terminal 20*e* is connected through a resistor 306 to the base electrode of a PNP transistor 308. The base electrode of the transistor 308 is connected through a resistor 310 to both the emitter electrode of the transistor 308 and to the +24 volt bias at the terminal 20*b*. The collector electrode of the transistor 308 is connected to the base electrode of the transistor 216 through a resistor 312.

With the terminal 20*e* at the ground potential the transistor 308 becomes conductive thereby reverse biasing the diode 238 and forward biasing the transistor 216 to become conductive. Since the diode 238 is reverse biased, the fact that the transistor 242 is also conductive is immaterial because the reverse biased diode 238 prevents the transistor 242 from acting as a shunt to ground. When the transistor 216 becomes conductive it provides a shunt to ground at the base of the ready driver transistor 214 to make it non-conductive. When the ready driver transistor 214 becomes non-conductive it de-energizes the ready relay 222 and opens the relay contacts 226. The telephone coupler 32 senses that the contacts 226 have opened and effectively "hangs up" on the telephone caller. If the telephone caller tries to call again the coupler 32 will not automatically answer the phone call and the phone call will have to be handled manually. Similarly if the tape has been exhausted by one of the remote dictating stations 14 the coupler also will not automatically answer the telephone call.

The control module of the invention thus provides a privacy function for the recording of telephone messages on a remote station-dictating system. Furthermore, since the "logic" signals which control the operations of the system are in fact D.C. currents passed over the same leads which carry the audio signals, a great simplification of circuitry is achieved with a concomitant decrease in manufacturing cost and an increase in reliability.

While in the above embodiment the PHONE and RECORD switches 192 and 190, respectively, are described as being in the transcribe station, it should be apparent that in other embodiments these switches may be located wherever it is convenient, such as at a receptionist's switchboard, for example.

Furthermore while transistors of certain conductivity types have been described above it should be apparent that in other embodiments transistors of different conductivity types may be substituted with appropriate changes in the polarities of the biasing circuits. In still other embodiments other types of semiconductor electronic switches, such as silicon controlled rectifiers, by way of example only, may be substituted individually or for combinations of the switching transistors such as transistors 116, 124, 140, 150, 186, 206, 214, 216, 242, 264, 274 and 308, for example.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A control circuit for interconnecting an external telephone system through an automatic answering coupler with a central record/playback unit of a dictating system of the type having an endless recording loop and a seizure control, the interconnecting control circuit comprising a pre-amplifier for receiving audio signals from the answering coupler and first means connected to said pre-amplifier for supplying the amplified signals received from said pre-amplifier to the input of the central record/playback unit for recording, said first means including a D.C. current path over which said amplified signals are supplied to said central record/playback unit and which also carries D.C. current signals from the central record/playback unit so as to activate the seizure control of the central record/playback unit.

2. A control circuit as recited in claim 1 wherein the central record/playback unit includes a loop tautness sensing switch which is activated when the loop of available recording material for dictation has been exhausted and wherein the interconnecting control circuit further includes means responsive to the activation of the recording loop tautness switch for deactivating the seizure control and the answering coupler to terminate the recording operation when the available loop of recording material has been exhausted.

3. A control circuit for coupling a central record/-playback unit of an endless tape loop recording system with an external, automatic telephone answering coupler which provides a source of audio signals, the central record/playback unit having a recording section and a seizure section, the coupling control circuit comprising an audio pre-amplifier for receiving and amplifying audio signals received from the automatic answering coupler, first means coupled to said pre-amplifier for supplying the amplified audio signals to the recording section of the central record/playback unit for recording on the endless loop of tape, the first means including a D.C. current path established through the answering coupler when said coupler is actuated, and means responsive to the presence of D.C. signals from the central record/playback unit through the established D.C. current path for controlling both the seizure control section of the central record/-playback unit and the answering coupler.

4. A control circuit as recited in claim 3 wherein the central record/playback unit further includes privacy means for producing a privacy control signal when the seizure section is activated and the control circuit further includes means responsive to the privacy control signal to prevent the answering coupler from being initially activated throughout the duration of the privacy control signal.

5. An improved record/playback dictating system for use with an automatic telephone answering coupler of the type which has a plurality of input terminals and which will automatically supply audio signals from a telephone transmission line in response to a ringing signal provided a first pair of its input terminals are connected together, the answering coupler being further provided with a pair of switch contacts which close when the answering coupler is activated to provide the audio signals, the dictating system being of the type which has a plurality of remote dictating stations connected to at least one common terminal at a central record/playback unit, the remote dictating stations each including a record/playback rewind function control circuit and a separate privacy and seizure control circuit, the central record/playback unit having an endless loop of recording material, means for recording signals on and playing signals back from the recording material and electromechanical means for movably supporting the loop of recording material during the recording of signals on the recording material, wherein the improvement comprises a privacy and seizure control circuit for each remote dictating station including electronic first switch means connected in series between the record/playback/rewind function control circuit and the common terminal, first means at the central record/playback unit for selectively supplying a first bias voltage of a predetermined polarity to the first switch means to make it become substantially conductive, second bias means at the central record/playback unit for supplying a second bias voltage of a polarity opposite to that of the first bias voltage, electronic second switch means responsive to the conductive state of the first switch means and connected between the second bias means and the first switch means for supplying the second voltage to the first switch means to maintain it in its substantially conductive state when the first switch means is made substantially conductive by the first bias means, electronic third switch means at the central record/playback unit, the third switch means including a control electrode and a resistance element connected between the control electrode and the second bias means, the third switch means being conductively responsive to the flow of current from the second bias means through the resistance element, the third switch means being connected between the second bias means and the electro-mechanical means for supplying the second voltage to activate the electro-mechanical means when the third switch means is conductive, the electro-mechanical means including means connected in series between the second bias means and the first switch means of each remote dictating station to supply the second voltage as a potential reverse bias voltage to the first switch means of each remote dictating station when the electro-mechanical means is activated, thereby preventing the seizure control circuits of the remote dictating stations from thereafter becoming activated, control means for interconnecting the answering coupler with the central record/playback unit, the interconnecting control means including pre-amplifier means for receiving and amplifying the audio signals from the answering coupler, and means for supplying the amplified signals from the pre-amplifier means to the input of the central record/playback unit for recording, the preamplifier means including a direct current return path through the switch contacts of the answering coupler to the common terminal for causing current to flow from the second bias means through the resistance element of the third switch means to make the third switch means become conductive and activate the electromechanical means, thereby reverse biasing the first switch means of each remote dictating station.

6. An improved record/playback dictating system as recited in claim 5 wherein the interconnecting control means further comprises means responsive to the reverse bias voltage from the electro-mechanical means to prevent the interconnecting control means from becoming activated if the central record/playback unit has already been seized by one of the remote dictating stations.

7. A control circuit for interconnecting an external telephone system to a central record/playback unit of a dictating system via an automatic answering coupler, said central record/playback unit having an endless loop of recording tape upon which audio signals may be recorded from any one of a plurality of remote dictating stations included in said dictating system and wherein said central unit further includes seizure control means actuable to enable a single station to communicate with said central unit, said control circuit comprising means for conditioning said coupler to automatically answer an incoming telephone call from said telephone system when said central unit is not communicating with any other remote dictating stations; lockout means coupled to said conditioning means and responsive to a privacy signal transmitted by said central unit when said central unit is communicating with a remote dictating station for preventing said coupler from automatically answering an incoming telephone call; and means for actuating said seizure control means when an incoming telephone call is answered to enable audio signals received from said telephone system to be transmitted through said coupler to said central unit for recording and to cause said privacy signal to be transmitted to all of said remote dictating stations.

8. A control circuit as recited in claim 7 further including amplifying means for amplifying said audio signals transmitted to said central unit.

9. A control circuit as recited in claim 8 wherein said amplifying means includes an automatic volume control circuit.

10. A control circuit as recited in claim 7 wherein said conditioning means comprises first switch means; and first switch control means for maintaining said first switch means in a first predetermined condition when said central unit is not communicating with any other remote dictating station.

11. A control circuit as recited in claim 10 wherein said lockout means comprises first transistor means responsive to said privacy signal for de-energizing said first switch control means to thereby dispose said first switch means in a second condition.

12. A control circuit as recited in claim 11 wherein said lockout means further includes second transistor means for detecting when the capacity of said recording tape to record audio signals has been exhausted and to thereby dispose said first switch means in said second condition.

13. A control circuit as recited in claim 12 wherein said coupler includes second switch means to be closed when an incoming telephone call is answered and said means for actuating said siezure control means comprises means responsive to the closure of said second switch means to establish a DC path to said siezure control means for current to flow thereover and to thereby actuate said siezure control means.

14. A control circuit as recited in claim 13 wherein said lockout means further includes means responsive to the flow of current in said established DC path for preventing said first transistor means from responding to a privacy signal transmitted by said central unit when said central unit is communicating with said coupler.

* * * * *